United States Patent
Guo et al.

(10) Patent No.: US 9,497,112 B2
(45) Date of Patent: Nov. 15, 2016

(54) VIRTUAL DATA CENTER ALLOCATION WITH BANDWIDTH GUARANTEES

(71) Applicant: Microsoft Technology Licensing, LLC, Redmond, WA (US)

(72) Inventors: Chuanxiong Guo, Nanjing (CN); Guohan Lv, Seattle, WA (US); Shuang Yang, Beijing (CN); Jiahe Helen Wang, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 295 days.

(21) Appl. No.: 14/195,627

(22) Filed: Mar. 3, 2014

(65) Prior Publication Data

US 2014/0281026 A1 Sep. 18, 2014

Related U.S. Application Data

(62) Division of application No. 12/790,433, filed on May 28, 2010, now Pat. No. 8,667,171.

(51) Int. Cl.
| | | |
|---|---|---|
| G06F 15/16 | (2006.01) | |
| H04L 12/721 | (2013.01) | |
| H04L 12/701 | (2013.01) | |
| G06F 9/50 | (2006.01) | |
| G06F 12/00 | (2006.01) | |

(52) U.S. Cl.
CPC ............ *H04L 45/34* (2013.01); *G06F 9/5077* (2013.01); *H04L 45/00* (2013.01)

(58) Field of Classification Search
USPC ............... 709/203, 223–229, 238–242, 250
See application file for complete search history.

(56) References Cited

U.S. PATENT DOCUMENTS

| | | | |
|---|---|---|---|
| 7,006,472 B1 * | 2/2006 | Immonen ............ | H04L 12/5695 370/332 |
| 7,319,691 B2 * | 1/2008 | Qing .................. | H04L 45/00 370/351 |
| 7,463,648 B1 | 12/2008 | Eppstein et al. | |
| 7,934,020 B1 * | 4/2011 | Xu ..................... | G06F 9/485 709/223 |

(Continued)

OTHER PUBLICATIONS

"Advanced Virtualization Benefits of Windows Server 2008 Editions for the Enterprise", retrieved on Apr. 14, 2010 at <<http://download.microsoft.com/download/8/2/f/82fa3808-7168-46f1-a07b-fla7c9cb4e85/WS08_Advanced_Virtualization_Benefits_White_Paper_FINAL.doc>>, Microsoft Corporation, White Paper, Feb. 2008, pp. 1-16.

"Cisco VFrame Data Center 1.2 Service Orchestration Solution", retrieved on Apr. 14, 2010 at <<http://www.cisco.com/en/US/prod/collateral/netmgtsw/ps6505/ps8463/product_data_sheet0900aecd8068ee1e.html>>, Cisco Systems, Data Sheet Release Notes for Cisco VFrame Data Center, Version 1.2, 2008, pp. 1-10.

Davis, "VMware ESX Server Cluster and Resource Pools Explained", retrieved on Apr. 14, 2010 at <<http://www.petri.co.il/vmware-esx-server-cluster-pools.htm>>, Blue Whale Web Inc., Jan. 8, 2009, pp. 1-4.

(Continued)

*Primary Examiner* — Zarni Maung
(74) *Attorney, Agent, or Firm* — Alin Corie; Sandy Swain; Micky Minhas

(57) ABSTRACT

A virtual data center allocation architecture with bandwidth guarantees that provides for the creation of multiple virtual data centers from a single physical infrastructure. The virtual data center allocation is accomplished in three steps. First, clusters are created from the servers in the physical infrastructure. Second, a bipartite graph is built to map the virtual machines to the servers located in a particular cluster and finally a path is calculated between two virtual machines. The virtual data centers may be dynamically expanded or contracted based on changing bandwidth guarantees.

20 Claims, 7 Drawing Sheets

(56) References Cited

U.S. PATENT DOCUMENTS

| | | | |
|---|---|---|---|
| 8,705,513 B2* | 4/2014 | Van Der Merwe | H04L 47/72 370/351 |
| 2004/0037313 A1* | 2/2004 | Gulati | H04L 12/56 370/465 |
| 2005/0044301 A1 | 2/2005 | Vasilevsky et al. | |
| 2005/0080982 A1 | 4/2005 | Vasilevsky et al. | |
| 2005/0120160 A1 | 6/2005 | Plouffe et al. | |
| 2005/0289071 A1 | 12/2005 | Goin et al. | |
| 2005/0289401 A1 | 12/2005 | Goin et al. | |
| 2007/0027973 A1 | 2/2007 | Stein et al. | |
| 2007/0067435 A1 | 3/2007 | Landis et al. | |
| 2009/0199177 A1 | 8/2009 | Edwards et al. | |
| 2010/0050179 A1 | 2/2010 | Mohindra et al. | |
| 2011/0004791 A1 | 1/2011 | Kokubu et al. | |
| 2011/0142053 A1* | 6/2011 | Van Der Merwe | H04L 47/72 370/395.1 |
| 2011/0225277 A1 | 9/2011 | Freimuth et al. | |
| 2012/0072762 A1* | 3/2012 | Atchison | G06F 9/5072 714/2 |

OTHER PUBLICATIONS

Office action for U.S. Appl. No. 12/790,433, mailed on Feb. 8, 2013, Guo et al., "Virtual Data Center Allocation with Bandwidth Guarantees", 11 pages.

Final Office Action for U.S. Appl. No. 12/790,433, mailed on May 22, 2013, Guo et al., "Virtual Data Center Allocation with Bandwidth Guarantees", 11 pages.

Simmons, Lutfiyya, Avram, Chen, "A Policy-Based Framework for Managing Data Centers", retrieved on Apr. 14, 2010 at <<http://www.csd.uwo.ca/~bsimmons/personal/papers/simmonslutfiyya-noms2006.pdf>>, IEEE Network Operations and Management Symposium (NOMS), Apr. 3, 2006, pp. 1-4.

* cited by examiner

VIRTUAL DATA CENTER ALLOCATION WITH BANDWIDTH GUARANTEES

RELATED APPLICATIONS

This application claims priority to U.S. patent application Ser. No. 12/790,433, filed on May 28, 2010, and entitled "Virtual Data Center Allocation with Bandwidth Guarantees", which is incorporated herein by reference.

BACKGROUND

Many data centers today are dependent on the physical infrastructure of a particular data center. Allocation of resources in a physical infrastructure is limited in its ability to adjust to customer needs as well as the cost associated with allocating physical resources to a particular customer.

With the advent of cloud computing applications such as Amazon® EC2, Google® App Engine, and Microsoft® Azure, computing-as a-utility is becoming a reality. By outsourcing computing to the cloud, utility computing frees businesses and consumers from the cost and burden of planning, purchasing, operating, and maintaining physical hardware and software, and at the same time, it offers elasticity to meet dynamic demands in resources and good economy with a pay-as-you-go billing model. The resource allocation and Service Level Agreement (SLA) of today's utility computing are centered around computation (dollars per hour per VM), storage (dollars per GB per month), Internet tracking (dollar per GB transferred), and the availability of these resources. Nevertheless, no abstraction or mechanisms and hence no SLAs are available to capture the requirements on the interactions among the allocated virtual machines (VMs), such as bandwidth guarantees among the VMs.

SUMMARY

This document describes a data center virtualization architecture using virtual data centers (VDCs) as the mechanism for resource allocation. A VDC is defined as a set of VMs with a customer-supplied Internet Protocol (IP) address range and an associated service level agreement (SLA). The SLA specifies not only computation, storage, and data transfer requirements (such as the number of VMs, CPU, memory, and disk space of each VM), but also bandwidth guarantees for all VM-pairs. The bandwidth guarantee offers the benefit of performance predictability for distributed computing. A VDC gives the illusion of a dedicated physical data center. This may require the VDCs to be isolated from one another in all resource access and usage. A VDC is preferable to a physical data center because it offers elasticity which allows its SLA to be adjusted according to the customer's dynamic demands.

In order to maximize its usefulness, the architecture design is scalable. For example, state maintenance at switches may scale up to hundreds of thousands of servers and millions of VMs in a data center. The architecture also provides efficient allocations of VDCs of all specifications and support elasticity seamlessly. At the same time, the architecture achieves high utilization of the resources. Finally, the architecture is practically implementable and deployable with commodity servers and switches.

VDCs may be dynamically adjusted as customers' needs change and the architecture provides isolation and bandwidth guarantees for multiple VDCs on top of a single physical data center infrastructure.

In one embodiment, the VDC allocation system described may include forming clusters of different sizes from servers located in the physical data center, building a bipartite graph to map VMs to the servers located in a particular cluster and calculating a routing path between two VMs.

In another embodiment, a system is described which may include a VDC manager for allocating bandwidth and allocating the routing paths for multiple VDCs. The system further includes multiple servers and multiple switches in the physical infrastructure. The servers may perform packet classification, shaping and pinning a particular path with source routing. The switches and the servers may implement priority queuing for the multiple routing paths.

Another embodiment allows for dynamic expansion of a VDC by increasing bandwidth reservation along an existing path, allocating a first path for a particular VM pair in the event an existing path has insufficient bandwidth, maintaining a to-be-allocated virtual machine log that includes multiple VMs and multiple to-be-allocated VMs for migration to a second path in the event the first path allocation is unacceptable, and allocating the to-be-allocated VM log with a same cluster. The dynamic expansion may further include adding a particular existing virtual machine into the to be allocated VM log in the event the second path cannot be allocated between the particular VM and the particular to-be-allocated VM, choosing a larger cluster containing the existing cluster and repeating the process.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter.

BRIEF DESCRIPTION OF THE CONTENTS

The detailed description is described with reference to accompanying figures. In the figures, the left-most digit(s) of a reference number identifies the figure in which the reference number first appears. The use of the same reference numbers in different figures indicates similar or identical items.

DETAILED DESCRIPTION

Overview

Figure 1:
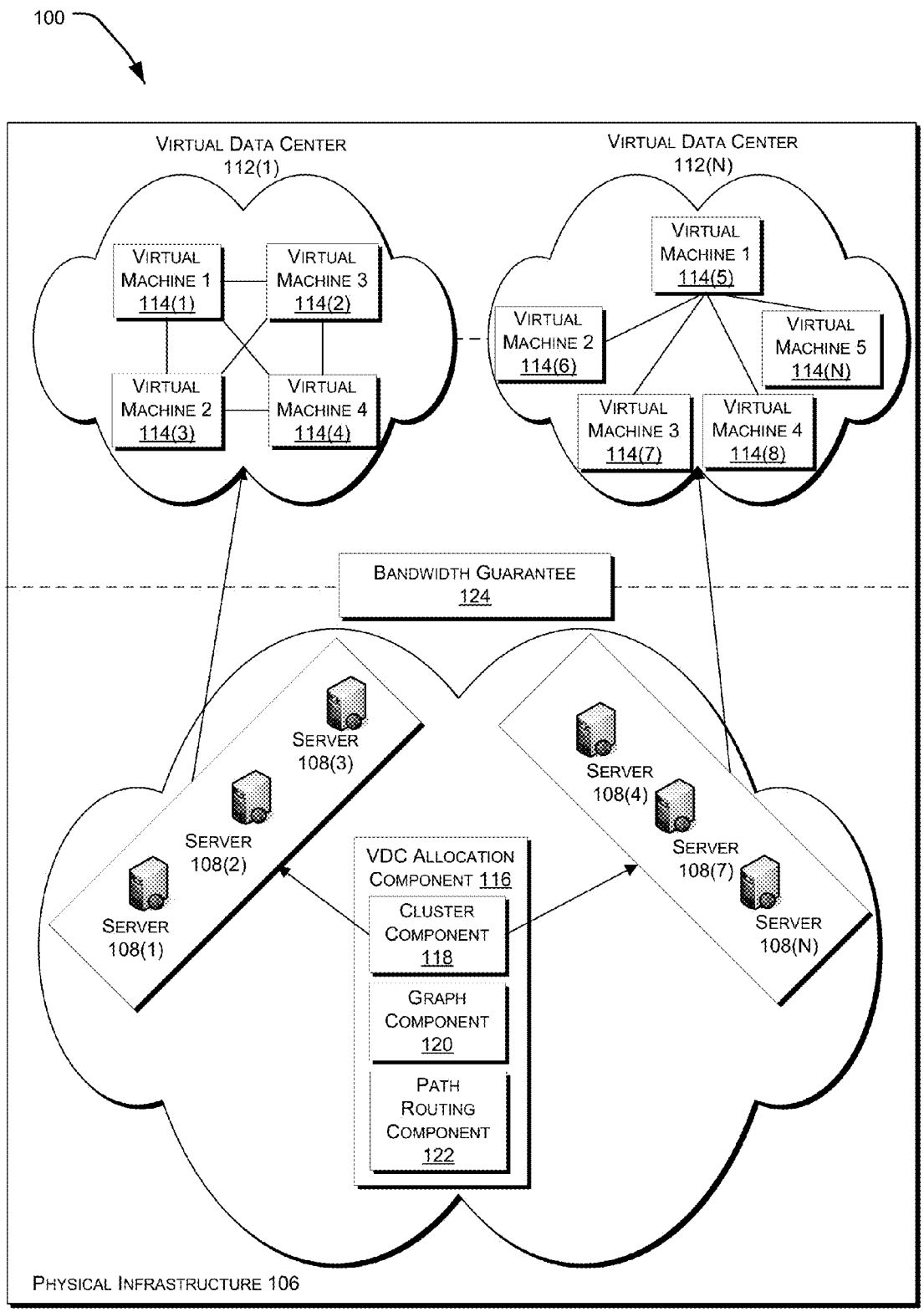
FIG. 1 is a block diagram that illustrates an example virtual data center allocation architecture.

FIG. 1 shows a virtual data center allocation architecture 100. In a virtual data center allocation architecture, a single physical infrastructure 106 may be used to provide multiple VDCs 112(1) . . . 112(N) for various users with differing requirements. VDCs may be more desirable than physical data centers because the resources allocated to VDCs can be dynamically adjusted as customers' needs change. To enable the VDC abstraction, a data center virtualization architecture or VDC allocation component 116 may provide isolation and bandwidth guarantees for multiple VDCs on top of a single physical data center infrastructure 106. To provide bandwidth guarantees, a data center may be administered by a single entity with a known topology. A centralized VDC allocation algorithm may be used to cluster physical servers 108(1) . . . 108(N) into different locality groups using a cluster component 118. Clustering allows the allocation algorithm to achieve high network utilization and to have low time complexity.

The VDC allocation algorithm incorporates three components. In the first component, servers 108 in the physical data center may be divided into clusters using the cluster component 118. Clusters may be formed by servers 108 within a certain diameter or within a certain distance of each other where a predetermined value or threshold distance may be specified to help form the clusters. A server 108 may join multiple clusters of different diameters. In the second step, a graph component 120 is used to create a bipartite graph with virtual machines (VMs) 114(1) . . . 114(N) of a VDC in the left side and physical servers of a cluster in the right side. An edge is drawn from a VM 114 to a physical server 108 if the server 108 is a feasible candidate to the VM 114. A server 108 is a feasible candidate if its residual central processing unit (CPU), memory, disk, and egress/ingress bandwidths all meet the needs of the VM 114. The min-cost flow algorithm described below is used to solve the matching or mapping between the VM and the server. In the third step, routing paths for each VM-pair are found using a path routing component 122. The paths found are ideally able to meet the bandwidth guarantee 124 of the VDC.

In order to provide for a scalable data plane for the VDC, a virtual-to-physical mapping and routing paths along with bandwidth reservation states are stored in the hypervisors of servers, thus creating stateless switches. The mapping is conducted in such a way that VDC allocation of users' requirements for central processing unit (CPU), memory, disk and bandwidth may all be satisfied. Port switching based source routing (PSSR) provides for easier deployment of the architecture. PSSR is described further below and in FIG. 4. PSSR is agnostic to the underlying network topologies and can be implemented using commodity switches, such as Multiprotocol Label Switching (MPLS) switches. The VDC architecture using the allocation algorithm can allocate VDCs with 5000 VMs in a physical infrastructure of 100,000 machines in hundredths of seconds.

Some applications desire performance predictability and can benefit significantly from having bandwidth guarantees 124 between VM-pairs. For example, many web services can be divided into three tiers: a frontend Web server tier, a middle application tier for business logic, and a backend database/storage tier. It is desirable to have bandwidth guarantees for the frontend-to-middle and middle-to-backend communications to enable service to customers with predictable performance. Also, distributed computing applications, such as those that use Google's® MapReduce for data-intensive operations, need to shuffle huge amounts of data among many servers. The execution of distributed computing application jobs may be severely delayed by a small number of straggling tasks due to contentions for network bandwidth. Bandwidth guarantees make it possible to predict the execution time of such distributed computing applications and hence how long a VDC needs to be rented.

There are applications, such as background file backup, that do not need to utilize bandwidth guarantees. A best-effort network service is sufficient for them.

Finally, there are applications whose detailed traffic patterns cannot be predetermined, but such applications still prefer better than best-effort service. For example, when enterprises move their IT infrastructures into the cloud, they can reserve egress/ingress bandwidths for their Web/email/file servers and assign better than best-effort priority to these services for service differentiation.

Based on these observations, a service model of three VDC service types may be supported. Type-0 service provides guaranteed bandwidth between two VMs, which is analogous to Integrated Service. A traditional best-effort service without any bandwidth guarantee may also be supported. Between type-0 and best-effort, a type-1 service may be supported that provides local egress/ingress bandwidth reservation for a virtual machine.

From a service differentiation point of view, type-0 provides hard end-to-end bandwidth guarantee. Type-1 only provides last and/or first hop guarantee, but its performance is better than best-effort. Therefore, type-0 traffic is assigned the highest priority, type-1 traffic is assigned the next highest priority and best-effort traffic is assigned the lowest priority. Type-0 and type-1 traffic may be monitored and shaped according to individual reservation rules and to ensure that they do not violate their individual reservations.

Illustrative Architecture

Figure 2:
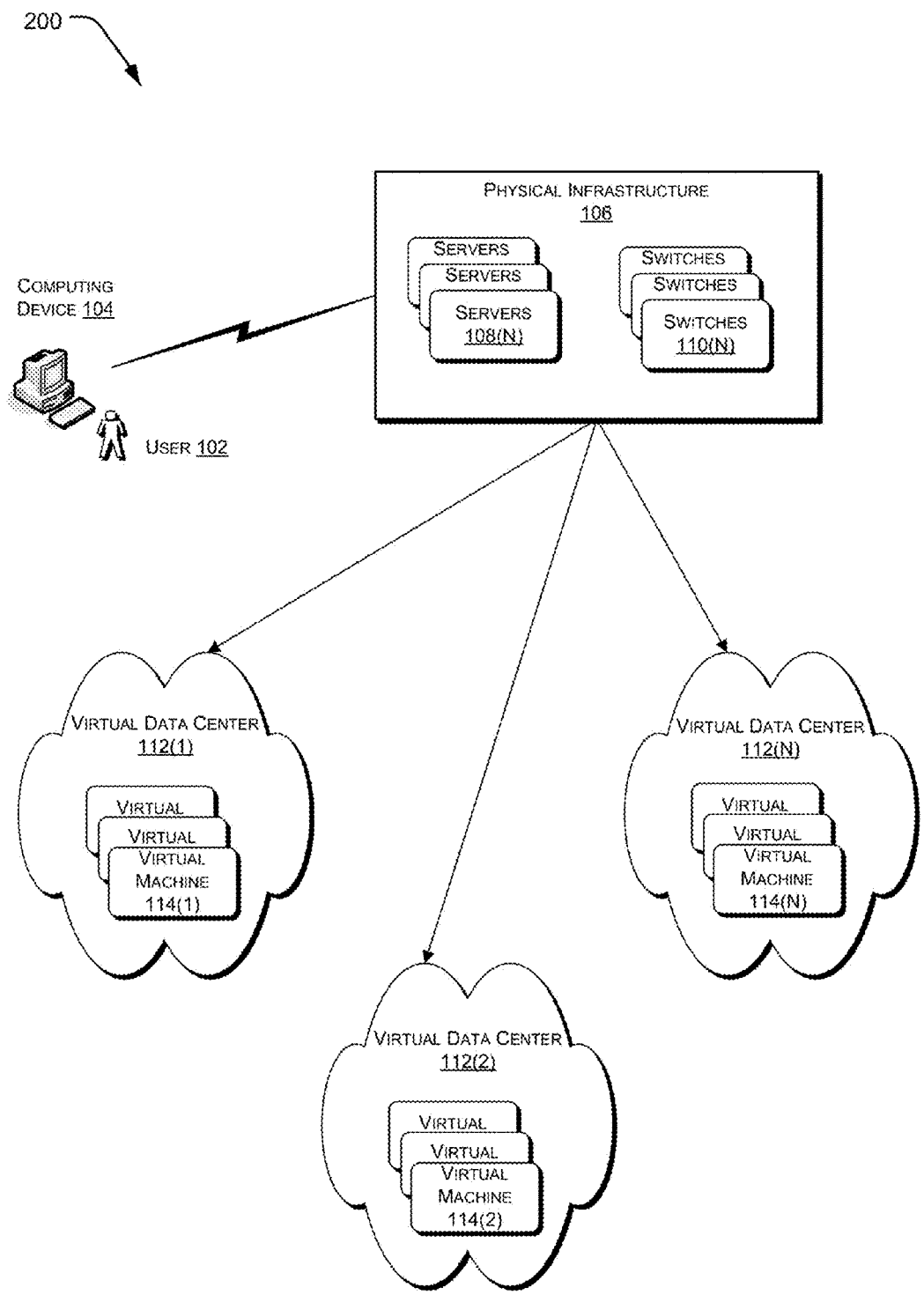
FIG. 2 illustrates an example of a virtual data center allocation architecture from FIG. 1.

FIG. 2 illustrates an example 200 of virtual data center allocation architecture 100 from FIG. 1. User 102 and computing device 104 interact with physical infrastructure 106. Physical infrastructure 106 may include servers 108(1) . . . 108(N) and switches 110(1) . . . 110(N). The physical infrastructure 106 may create and manage multiple virtual data centers 112(1) . . . 112(N). The VDCs 112 each may include multiple virtual machines 114(1) . . . 114(N). This high level concept of the architecture is more fully described in FIGS. 2 and 3 below.

Figure 3:
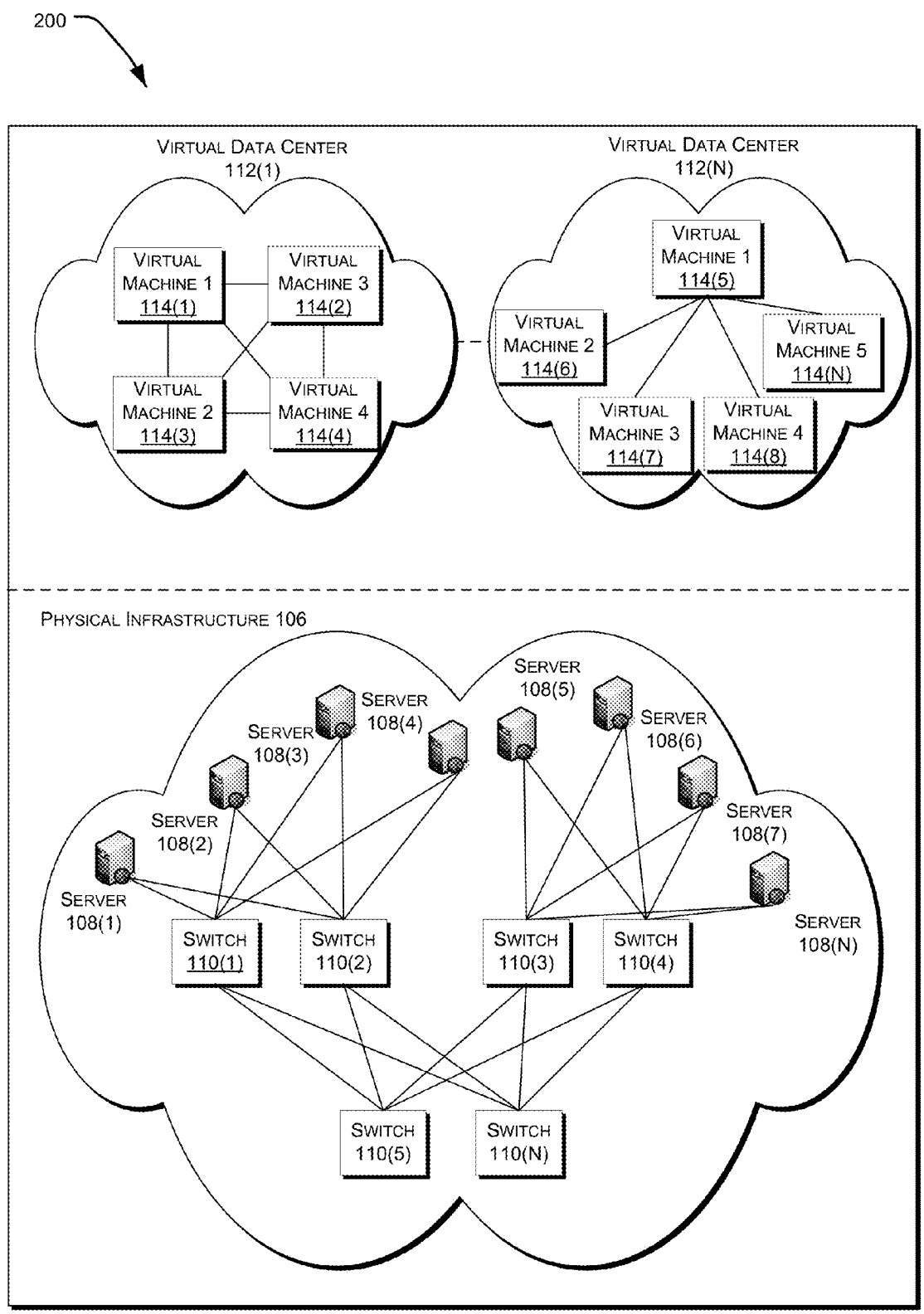
FIG. 3 is a block diagram that illustrates selected example components for the performance and administration of the virtual data center allocation architecture.

FIG. 3 illustrates selected example components for the performance and administration of the virtual data center allocation architecture 200 represented in FIG. 2. Physical infrastructure 106 may include servers 108(1) . . . 108(N) and switches 110(1) . . . 110(N). VDCs 112(1) . . . 112(N) may contain different clusters and formations of VMs 114(1) . . . 114(N). In the example in FIG. 2, VDC 112(1) illustrates one cluster where VM 114(1), 114(2), 114(3) and 114(4) are interconnected to each other. Meanwhile, VDC 112(N) illustrates another cluster where VM 114(5) is centrally connected to VMs 114(6) . . . 114(N). The VDCs 112 are created on top of the physical infrastructure 106.

Figure 4:
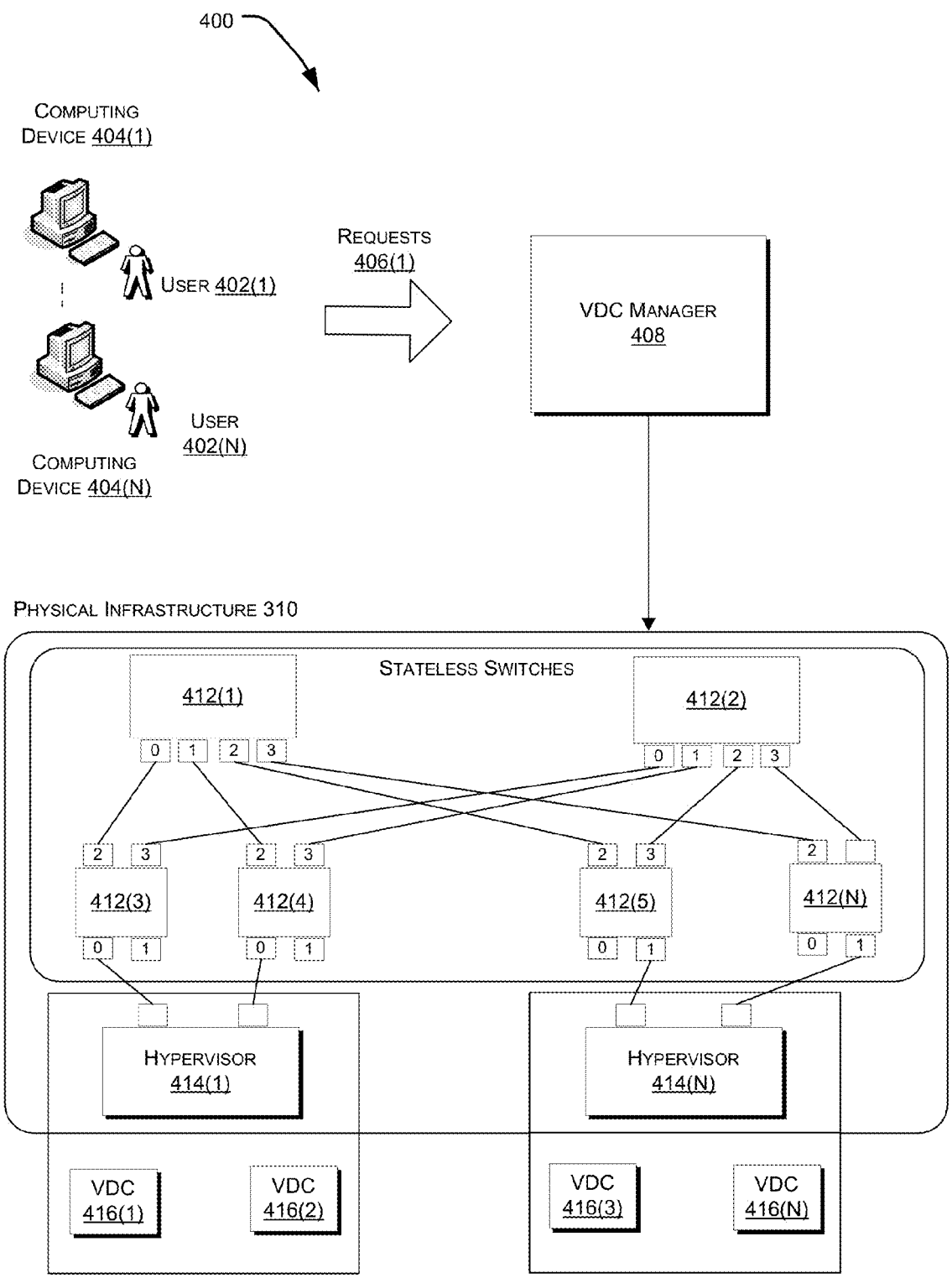
FIG. 4 is a block diagram that illustrates an example of an implementation of the virtual data center allocation architecture.

Turning now to FIG. 4, an example of an implementation of the virtual data center allocation architecture 400 is shown. Users 402(1) . . . 402(N) operate computing devices 404(1) . . . 404(N). The computing devices 404, at the direction of the users 402, generate requests 406 that are directed to a VDC manager 408. The VDC manager 408 handles VDC creation, adjustment, and deletion based on customers' requests. VDC manager 408 decides how the physical computation, storage, and bandwidth resources are allocated to VDCs. The VDC manager 408 also provides VDC address space isolation and virtualization, service differentiation and bandwidth guarantee, and routing path enforcement at server hypervisors 414(1) . . . 414(N) and switches 412(1) . . . 412(N), which are data plane functions. The VDC manager 408, server hypervisors 414, and switches 412 form the trusted computing base because they are managed by the data center operator at the physical infrastructure 410. The VMs that are part of the VDCs 416(1) . . . 416(N) are not trusted because they are controlled by end users.

The VDC manager 408 controls all resources. It performs admission control for VDC requests based on the available physical resources and the SLAs in the requests, using a VDC allocation algorithm.

In order to more fully understand the VDC allocation algorithm described below, a VDC allocation general discussion is useful. The physical network is denoted as G(S; X;E) where S is the set of servers, X is the set of switches and E is the set of links. Each link has a corresponding link capacity. A server $s_i$ has $k_i$ ($k_i \geq 1$) network ports $\{port_{s_i}^j | j \in [0, k_i-1]\}$. Ingress and egress residual bandwidths of $port_{s_i}^j$ may be denoted as $ib_{s_i}^j$ and $eb_{s_i}^j$, respectively. The residual ingress and egress bandwidths are called $ib_{s_i} = \max_j ib_{s_i}^j$ and $eb_{s_i} = \max_j eb_{s_i}^j$, respectively. Various denotations are summarized in the table below:

| | |
|---|---|
| G(S; X; E) | The physical network infrastructure |
| $C_k$ | Server cluster k |
| $s_i$ | Physical server i |
| $ib_{si}$ | Residual ingress bandwidth of $s_i$ |
| $eb_{si}$ | Residual egress bandwidth of $s_i$ |
| path($s_i$; $s_j$) | A routing path from server $s_i$ to $s_j$ |
| $VDC_g$ | Virtual data center with ID g |
| $vm_i^g$ | Virtual machine i in $VDC_g$ |
| $r_{i,j}^g$ | Requested bandwidth from $vm_i$ to $vm_j$ in $VDC_g$ for type-0 service |
| $er_i^g$, $ir_i^g$ | Requested egress, ingress bandwidth for $vm_i$ in $VDC_g$ for type-1 service |

For VDC allocation of type-0 service, there are m virtual machines and the associated m×m bandwidth matrix $R^g$, where $r_{i,j}^g$ denotes the bandwidth of the ($vm_i$, $vm_j$) virtual edge. The egress and ingress bandwidths of $vm_i^g$ are therefore $er_i^g = \Sigma_{j=0}^{m-1} r_{i,j}^g$ and $ir_i^g = \Sigma_{j=0}^{m-1} r_{j,i}^g$, respectively. For VDC allocation of type-1 service, there are m virtual machines and the associated egress/ingress bandwidth vector is $ER^g = \{(er_0^g, ir_0^g), (er_1^g, ir_1^g), \ldots (er_{m-1}^g, ir_{m-1}^g)\}$.

VDC allocation for best-effort service may be treated as a VDC allocation for type-1 service by setting the egress/ingress bandwidth guarantee vector to zero. Similarly, type-1 VDC allocation may be treated as a type-0 VDC allocation. Therefore, focus is placed on type-0 VDC allocation. Assuming one VM maps to one physical server, when a user prefers to allocate several VMs to one physical server, all these VMs are treated as one large VM by summing up their computation, storage, and bandwidth needs.

The issue of type-0 VDC allocation is to allocate the VMs $\{vm_i | i \in [0,m-1]\}$ to servers $s_{\pi_i}$ ($i \in [0,m-1]$) selected from the server set S in such a way that the computation requirements (CPU, memory, and disk) of $vm_i$ are satisfied and there exists a path path($s_{\pi_i}$, $s_{\pi_j}$) whose residual bandwidth is no smaller than $r_{i,j}^g$ for every VM-pair.

The VDC allocation issue has two parts: an allocation (decision problem) and minimal residual bandwidth used by the allocation (optimization problem). Both problems are NP-hard.

In developing a heuristic algorithm design, there are two considerations. First, the algorithm finishes within a reasonable amount of time (e.g., tens to hundreds of seconds for a VDC with thousands of VMs). Second, the algorithm utilizes the network bandwidth and accommodate as many VDCs as possible.

One of the keys to efficient and low time-complexity VDC allocation is to group servers into server clusters of different diameters and sizes. When allocating a VDC, a search is conducted on the appropriate clusters instead of the whole physical network. This leads to reduced allocation time. Further, servers within the same clusters have locality. Locality leads to efficient network bandwidth usage. The efficient min-cost flow algorithm for VM-to-physical-server mapping is used to take advantage of the rich connectivity of data center networks for quick path allocation. For example, in tree and fat-tree structures, servers within the same top-of-rack (ToR) switch form a ToR cluster, servers within the same aggregate switch form a Pod cluster, etc. A server can belong to multiple clusters. For instance, a server can belong to a ToR cluster, a Pod cluster, and/or the whole physical data center.

The VDC allocation architecture offers elasticity when customers' requirements change. For example, the affected VDC allocations may need to be adjusted to (re)meet their SLAs. In addition, the adjustments are performed as quickly as possible to minimize service interruption time.

Given this discussion of the VDC allocation issues, a detailed discussion of the VDC allocation algorithm is warranted. The VDC allocation algorithm is as follows:

```
/*R^g is the m x m bandwidth matrix of VDC_g*/
VTCAlloc(R^g):
1   for (k = 0; k < t; k + +)/*t is the clusters number*/
2       if (|C_k| < m) continue;
3       if ib(C_k) < ib(V DC_g)
4           continue;
Bipartite; /*build weighted bipartite graph*/
5       for (0 ≤ i < m)
6           for (0 ≤ j < |C_k|)
7               if (s_j ∈ C_k is a feasible candidate for vm_i)
8                   add edge (vm_i, s_j) to the bipartite;
9                   assign_weight ((vm_i, s_j));
matching: /*match VMs to servers in C_k*/
10      res=MinCostMatching( )
11      if (res== false) continue;
12      for each (i ∈ [0, m − 1])vm_i → s_πi,
path_alloc:
13      flag=0
14      for each (r^g_{i,j}≠ 0)
15          res=FindPath (s_πi, s_πj, r_{i,j})
16          if (res==false)
17              flag=1; break;
18      if (flag==0) return succeed;
19  return false; /*fail after visiting all the clusters*/
```

The VDC allocation procedure {\it VDCAlloc} is shown above. The input $R^g$ is the m×m bandwidth matrix of the to-be-allocated virtual data center $VDC_g$. The output is m physical servers that will host the virtual machines and the paths set corresponding to $R^g$. VDCAlloc has three steps. In the first step, a cluster $C_k$ may be selected. The number of servers of $C_k$ is larger than the VM numbers in $VDC_g$ (line 2 in the algorithm above). The aggregate ingress and egress bandwidths of $C_k$ is larger than those of $VDC_g$ (line 3).

In the second step, a bipartite graph is built with the VMs at the left side and the physical servers of $C_k$ at the right side (lines 5-6). A physical machine $s_i \in C_k$ is a feasible candidate to a virtual machine $vm_j^g$ if the residual CPU, memory, and disk space of $s_i$ meet the requirement, and the egress and ingress residual bandwidths of $s_i$ are no smaller than $er_j^g$ and $ir_j^g$, respectively. If server $s_i$ is a feasible candidate to $vm_j^g$, an edge is drawn from $vm_j^g$ to $s_i$ (lines 7-8).

Weights are assigned to the bipartite graph edges to reflect different server allocation policies (line 9). Several weight assignment policies may be considered. For example, in Load-Balancing Policy (LBP), lower weights may be assigned to edges that link to servers with larger residual bandwidth, CPU, memory, disk resources. LBP results in balanced allocation since servers with more available resources will be selected. In Power-Saving Policy (PSP), lower weights may be assigned to edges that link to servers with smaller resources. With PSP, the servers are divided into highly utilized and unused categories. The unused servers may be powered off for power saving purposes. In Uniform Policy (UNP), uniform weight may be assigned to all the edges, which means that equal preference may be assigned to all the feasible candidates. Other weight assignment policies may also be considered.

Figure 5:
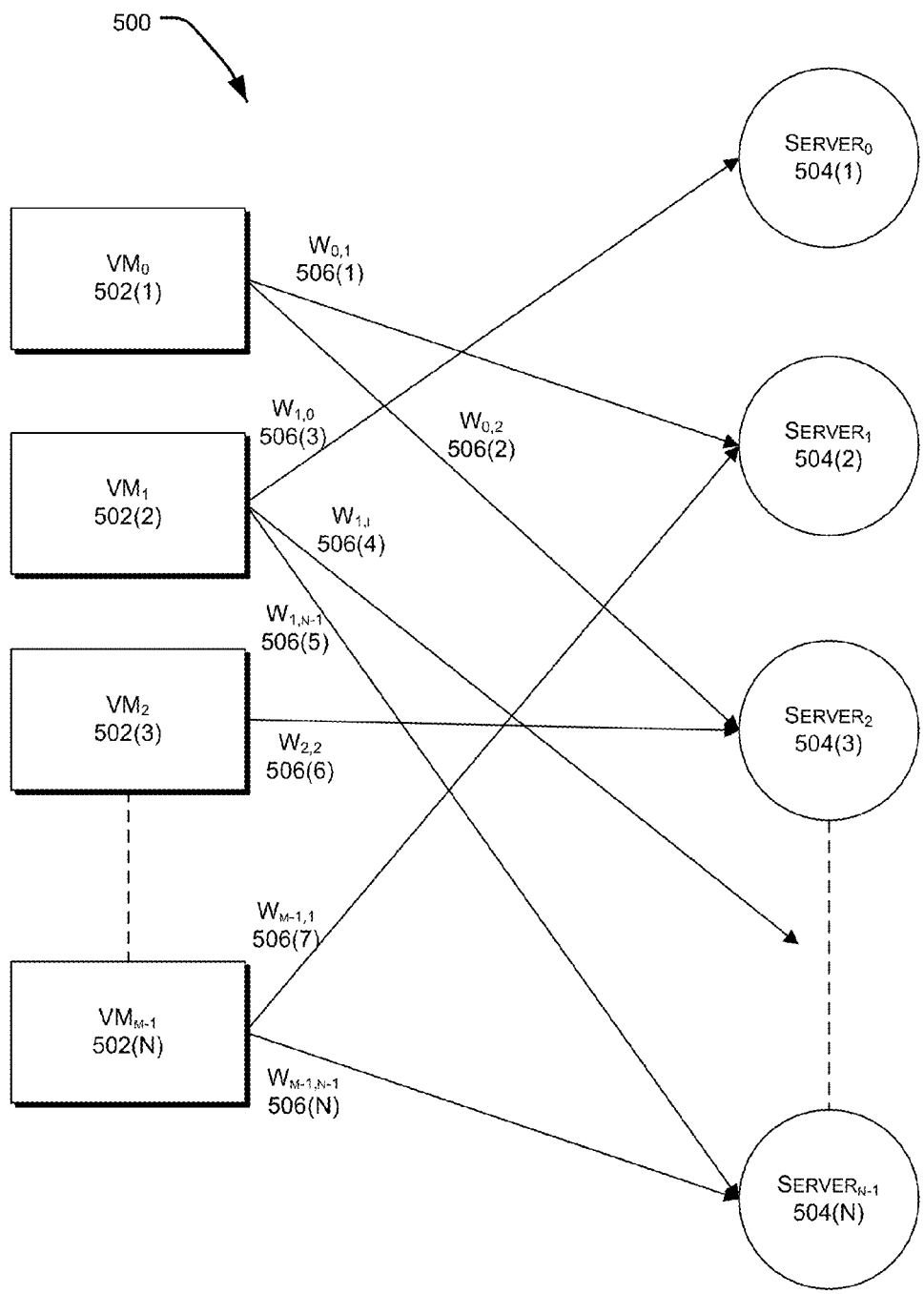
FIG. 5 is a block diagram that illustrates an example mapping between VMs and Servers.

Turning now to FIG. 5, an example of a mapping between VMs and servers or an allocation algorithm 500 is shown that incorporates the weights discussed above. VMs 502(1) ... 502(N) are mapped to servers 504(1) ... 504(N) using weights 506(1) ... 506(N). FIG. 5 illustrates this particular portion of the VDC allocation algorithm (line 9).

Turning back to the VDC allocation algorithm, the min-cost network flow may be used to solve the weighted bipartite graph matching (line 10). A source node src may be added at the left side of the VMs and a dst node may be added at the right side of the physical servers. Edges from src to the VMs and from the servers to dst may also be added. Unit capacity may be assigned to all the edges. The bipartite matching issue then transforms to the min-cost flow from src to dst with capacity m. If a matching cannot be found, another cluster is chosen and the process begins again. If a matching is found, the process proceeds to the third step.

In the third step, paths may be allocated for all the VM-pairs that have non-zero reserved bandwidths (lines 14-15). The requested bandwidth may be sorted in descending order and paths may be allocated sequentially, since paths with higher bandwidth request are more difficult to allocate. If a path cannot be allocated for a VM-pair, another cluster may be used.

FindPath may be used to allocate path from $s_{\pi_i}$ and $s_{\pi_j}$ with bandwidth guarantee $r_{i,j}^g$. In G(S;X;E), the links whose residual bandwidth is smaller than $f_{i,j}^g$ may be removed. The shortest-path to get a path from $s_{\pi_i}$ and $s_{\pi_j}$ may be used. Since all the links have unit length, a Breadth First Search (BFS) may be used to obtain the shortest-path algorithm. After a path for a VM-pair is assigned, the residual bandwidths of the links along the path may be updated. If a path for a VM-pair is not allocated, another cluster may be used and the process starts again. If paths for all $r_{i,j}^g \neq 0$ are allocated, the process is successful and the assigned physical servers and paths are returned. If an allocation cannot be found after searching all the clusters, the process is unsuccessful and the VDC allocation request is rejected.

VDCAlloc naturally supports VDCs that have multiple service types. For example, when a VM has both type-0 and type-1 requests, a bipartite edge between this VM and a server is feasible only when the egress and ingress residual bandwidths of the server meet the sum of the two requests. After the bipartite is constructed, the allocation procedure is the same.

VMs in a VDC may need to communicate with external computers. For instance, gateways may be used for this purpose. VDCAlloc can be directly applied to this case since the traffic to/from the external computers may be mapped to the gateways.

The major components, min-cost flow and path allocation, are of low time-complexity since all the edges in the bipartite graph have unit capacity, MinCostMatching can be solved in $O(n^3 \log(n+m))$, where n is the number of VMs and m is the number of servers in the current cluster. The worst-case time-complexity for path allocation is $O(n^2|E|)$, where |E| is the number of edges of the physical network. The complexity of VDCAlloc depends on how many clusters need to be tried before a matching is found.

Returning now to the VDC manager, the VDC manager is responsible for network virtualization of VDCs. Each VDC has its own IP address space (possibly supplied by the user), which may be overlapping with other VDCs' IP address spaces. The VDC manager assigns a unique ID to every VDC and uniquely identifies a VM by its VDC ID and IP address. When the VDC manager creates a VM for a VDC, it configures the server hypervisor with the VDC ID and IP address of the VM, the reserved bandwidths for type-0 and type-1 services, the routing paths for type-0 VM-pairs, and the rule set for mapping traffic to different service types.

Since the VDC manager maps VMs to physical servers, it is a natural place for the VM-to-physical-server resolution. For example, suppose $vm_0$ at server $s_0$ needs to talk to its peer $vm_1$, the host server $s_0$ looks up the host server of $vm_1$ through the VDC manager and caches the result for later use.

The VDC manager can scale with a large number of VDC requests both in computation and in bandwidth. One single server can perform VDC allocation for VDCs with thousands of VMs in hundredths of seconds. The traffic between the VDC manager and the servers includes VDC creation, adjustment, release requests and the associated configuration messages. The traffic volume is low. For example, the traffic volume for creating a VDC with 1000 VMs is about 30 MB, which can be transmitted in one second.

The VDC manager maintains two types of state for its operations. To perform VDC allocation, the VDC manager may store the complete physical network topology tagged with residual link capacities. For each allocated VDC, the VDC manager may store all the resource allocation state (i.e., the VM-to-physical-server mapping, egress/ingress bandwidth reservation for type-1 services, and bandwidth reservation and routing paths for type-0 services). As an example, it would take approximately 5 GB memory to store all the state for a VL2 network (a scalable and flexible data center network) that contains 100 k servers. For consistent, reliable, and high available state maintenance, the VDC manager may adopt a similar approach to that of the directory service of VL2 using replicated state machines and Paxos consensus protocol.

To provide the bandwidth guarantee discussed above, the routing path may be pinned for each type-0 VM-pair. One way to set up bandwidth reservation is to let the VDC manager setup the bandwidth reservation state in not only the physical servers, but also the switches along the routing path. However, this approach incurs scalability concerns in switch state maintenance.

To make state maintenance scalable at switches, source routing may be used. With source routing, switches become stateless and are unaware of any VDC and bandwidth reservation state. The switches perform priority queuing and forward packets based on the source routing information carried in the packet headers.

In the VDC allocation architecture, source hypervisors may store virtual-to-physical mappings, routing paths and the associated bandwidth reservation state. Hypervisors classify VM packets to different service types and assign priority to those packets according to the SLA rule set. They then monitor and shape the type-0 and type-1 traffic before the traffic enters switches. Best-effort traffic does not need traffic shaping due to its lowest priority. Best-effort traffic therefore can use network bandwidth when type-0 and type-1 services do not fully use their reservations. Hypervisors also encode the priority and routing path into packet headers. Traffic monitoring, shaping and prioritization is placed at hypervisors instead of VMs since VMs are not trusted.

Commodity servers and switches may be used in the VDC allocation architecture and they provide a good performance-price trade off. Consequently, both priority queuing and source routing may be implemented on commodity servers and switches. Priority queuing is widely available in both servers and switches. Source routing may be efficiently implemented in current server operating systems as kernel drivers.

However, source routing generally is not available in commodity switches. Furthermore, commodity switches typically use MAC or IP address for packet forwarding. Some data center network structures may even not use MAC or IP address. For example, both DCell (a scalable and fault-tolerant network structure for data centers) and BCube (a high performance, server-centric network architecture for modular data centers) introduce their own addressing schemes and PortLand (a scalable fault-tolerant layer 2 data center network fabric) overrides the MAC address to encode its fat-tree topology information.

Therefore, port-switching based source routing (PSSR) may be used. Instead of carrying a sequence of next-hop addresses in a source routing path, the sequence of next-hop output port numbers may be directly carried. With PSSR, the VDC allocation architecture becomes topology and addressing agnostic and may be implemented on top of any network topologies. For example, PSSR may be implemented readily with MPLS (multi-protocol label switching), which is a commodity technology. Path $\{0,2,2,1\}$ is for $vm_0$-$vm_1$ in $VDC_0$ and $\{1,3,3,1\}$ is for $vm_0$-$vm_1$ in $VDC_1$, respectively. These paths are illustrated as an example in FIG. 4. Suppose $vm_0$ in $VDC_0$ needs to send a packet to its peer $vm_1$, it first generates a packet that contains $vm_1$ as the destination address and $vm_0$ as the source address and delivers the packet to the host hypervisor $s_0$. The host $s_0$ then inserts the routing path, $\{0,2,2,1\}$, priority and related information into the packet header and sends the packet to the neighboring switch. The switches then route the packet using PSSR. After the destination server $s_1$ receives the packet, it removes the PSSR header, and delivers the packet to $vm_1$.

In summary, the VDC allocation algorithm provides bandwidth guarantee as follows: 1) the VDC manager allocates both bandwidth and routing paths for VDCs, 2) source servers perform packet classification, shaping, and pinning the path with source routing, and 3) both servers and switches perform priority queuing and forward packet using PSSR. The VDC allocation architecture provides service differentiation since different service types get different priorities.

There are three cases that a VM in a VDC needs to communicate to an external computer: to an Internet host, to a VM in another VDC, and to a distant computer that is in the same enterprise network of the VDC. The third case is similar to that provided in Amazon® VPC. Enterprises generally already have their own IT infrastructures. VDC makes it possible for them to move part of their computing facilities into the cloud. The existing (private) network, together with the VDC, forms the new network environment.

An external gateway may be used for an Internet host or for communication to a VM in another VDC. The external gateway speaks IP at the external side and the VDC allocation architecture protocol at the VDC side. By default, VMs in different VDCs cannot directly talk to each other due to security concern. But if needed, they can communicate through their external gateways. At least one VM needs to know the public IP address of the peer VM in another VDC. A VPN gateway may be used to handle communication to a distant computer that is in the same enterprise network of the VDC. This is the traditional VPN gateway (e.g., IPSec VPN) that connects private networks at different locations. There is a peer VPN gateway at the peer enterprise network. The two VPN gateways are connected through the public Internet.

Since the network topology and potential failures of a data center network are known, switches may be removed from making routing decisions and source routing may be used for a scalable data plane. For type-0 traffic, source routing paths are decided by the VDC manager. Server hypervisors directly use those paths for routing.

For type-1 and best-effort traffic, all the existing DCN routing designs can be easily implemented using source routing at source hypervisors. For example, both VL2 and BCube use source routing at the server side, hence they can be directly incorporated into the VDC allocation architecture framework. In PortLand, switches may use destination physical MAC (PMAC) hashing to decide the next hop. The source servers can easily calculate the routing path on behalf of the switches in this case. Similarly, the source servers can calculate routing paths for DCell, since DCell routing paths are directly derived from DCell IDs.

The overhead of source routing is the routing path carried in the header of every packet. The overhead for a scalable data plane and a flexible routing framework is minimal since the maximum path length of a typical data center network is small (typically 6-8 hops).

Port-switching simplifies switch functionalities and makes the VDC allocation architecture deployable with commodity switches. Traditionally, packet switching is based on destination address. In layer-2 Ethernet switches and layer-3 IP routers, packet switching is based on destination MAC and IP addresses, respectively. When a packet arrives at a port, the forwarding process of the switch extracts the destination MAC address from the packet header and uses it as the key to lookup the MAC table. The MAC table contains MAC address in one column and the output port number in another. By querying the MAC table, the forwarding process gets the output port and forwards the packet to that port. The MAC table is stored in SRAM or TCAM and its size may increase accordingly as the network size grows. Further, in order to maintain the MAC table, the switches may run a Spanning Tree Protocol.

Port-switching is designed to take advantage of the fact that the detailed data center network topology is known. Instead of carrying MAC or IP addresses, the output port numbers of the intermediate switches is carried directly in the packet header. The forwarding process directly gets the forwarding port from the packet header.

In topologies like DCell and BCube, neighboring servers are indirectly connected by transparent layer-2 switches. A server may have multiple neighbors via a single physical port. In order to handle this case, a virtual port may be used. A physical port can map to multiple virtual ports depending on the number of neighboring servers connected to a physical port. A server maintains a virtual port table in which every row represents a neighboring server. The row id corresponds to the virtual port number and each row contains fields including the physical port number and the MAC address of the neighboring server. The size of the virtual port table is the total number of neighboring servers. The virtual port table is static in nature unless the neighboring servers change their NICs.

Port-switching simplifies switch functionalities. There is no need for a signaling protocol to maintain the virtual port table since it is static in nature. Also the size of the virtual port table is small, since a node typically has at most tens of neighbors. As a comparison, the MAC table (or IP-lookup table) needs at least several thousand entries and its size increases as the network expands.

Port-switching can be naturally integrated with source routing to form a port-switching based source routing (PSSR) in which a source routing path contains port numbers instead of addresses. PSSR is topology and addressing agnostic and can be applied to different topologies and addressing schemes. PSSR may also be implemented with existing commodity switches, such as MPLS.

Conceptually, servers encode path and priority information into packet headers and switches perform priority queuing and forward packets based on port-switching for PSSR implementation. However, commodity switches may support PSSR as long as it has MPLS, a commonly available switching technology.

In MPLS, switches perform forwarding based on labels carried in packet headers. Labels only have local meaning between two adjacent switches. Switches rewrite the label of a packet hop-by-hop. Labels may also be stacked together to form label stack for MPLS tunneling. In MPLS, labels may be established by using a LDP (label distribution protocol) signaling protocol.

An MPLS label may be reinterpreted as a port. Consequently, the MPLS label table is interpreted as a virtual port table. Source routing may be implemented with MPLS label stack. Since the virtual port table is static and is pre-configured, signaling protocol like LDP is eliminated. An MPLS label is usually 20-bits, which is more than enough to describe the number of neighbors a switch or server has (typically less than one hundred). MPLS label also has 3 Exp bits for packet priority. Therefore, both PSSR and priority queuing with commodity MPLS switches may be implemented.

When proprietary hardware open router platform becomes widely available, PSSR may be implemented on that platform using standard API or platforms such as Open Router Propietary-Hardware Abstraction (Orphal®) or Openflow® (Stanford University's open router platform) due to the simplicity of PSSR.

Illustrative Process

Figure 6:
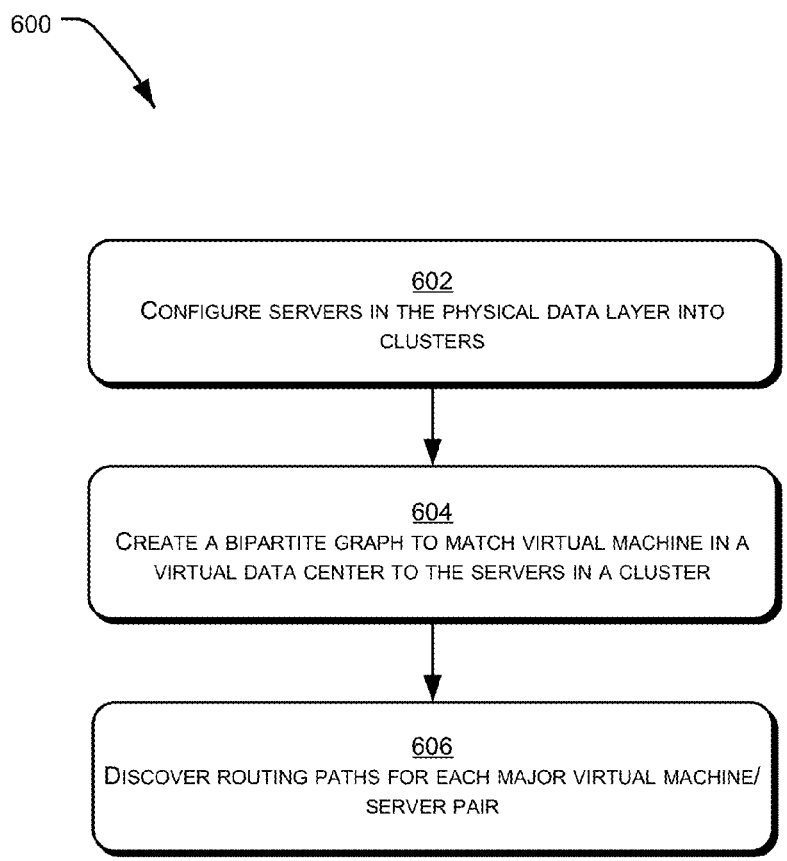
FIG. 6 is a flow diagram of an illustrative process for implementing the VM to physical server mapping of the virtual data center allocation algorithm.

FIG. 6 illustrates a process for implementing the virtual data center allocation algorithm 500 as discussed above. In operation 602, the servers in the physical data layer are configured into clusters. In operation 604, a bipartite graph is created to match VMs in a VDC to the servers in a cluster from operation 602. The routing paths for each major VM-server pair are discovered in operation 606.

Figure 7:
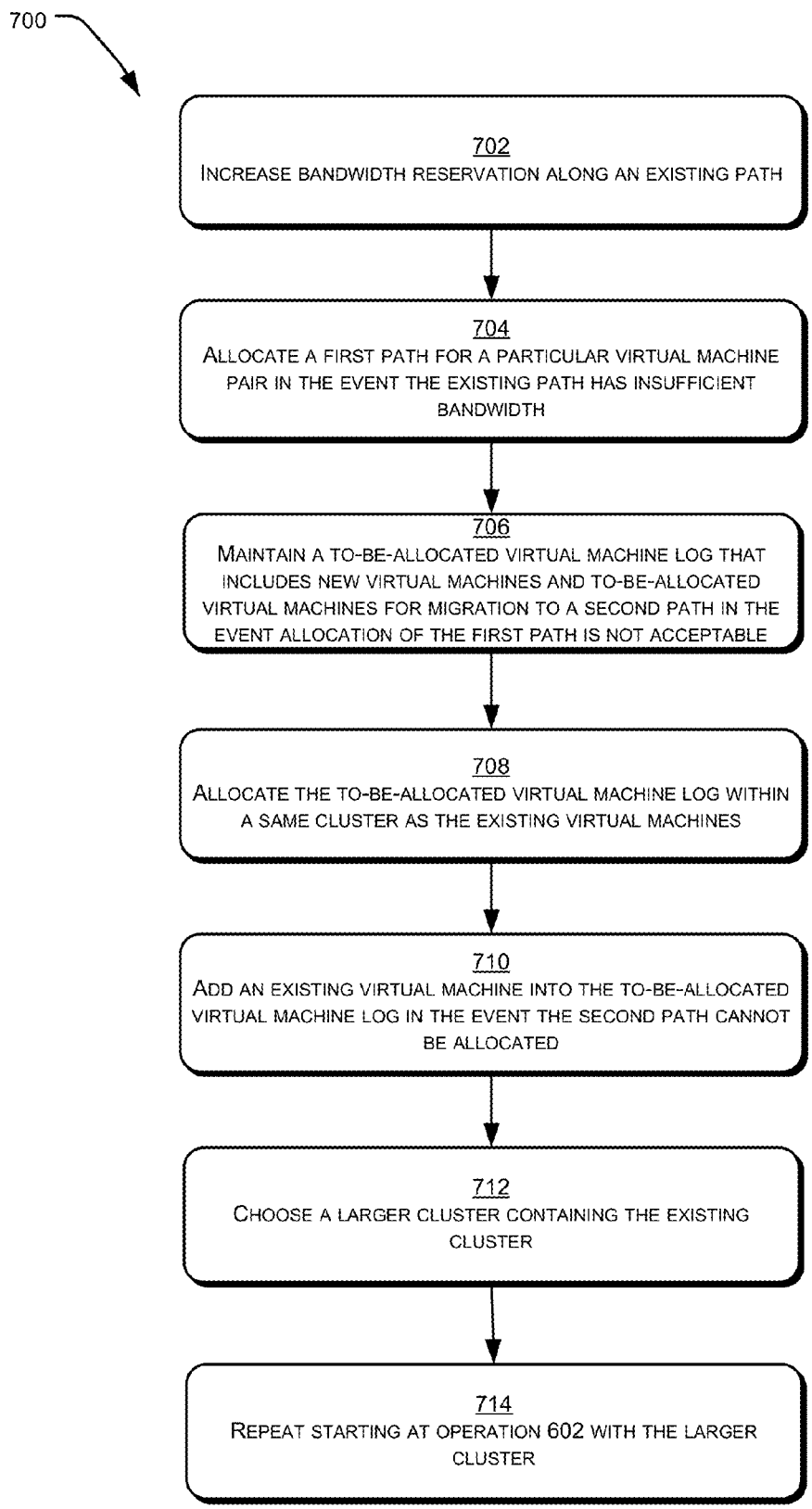
FIG. 7 is a flow diagram of an illustrative process for dynamically expanding a virtual data center.

FIG. 7 illustrates a process 700 for dynamically expanding a virtual data center. In operation 702, a bandwidth reservation is increased along an existing path. A first path for a particular VM pair is allocated in operation 704 in the event the existing path from operation 702 has insufficient bandwidth. Operation 606 maintains a to-be-allocated VM log that includes new VMs and to-be-allocated VMs for migration to a second path in the event allocation of the first path is not acceptable. Operation 708 allocates the to-be-allocated VM log within a same cluster as the existing VMs. In the event the second path cannot be allocated, operation 710 adds an existing VM into the to-be-allocated VM log. In operation 712, a larger cluster is chosen containing the existing cluster. In operation 714, the operation is repeated starting at operation 702 with the larger cluster.

The dynamic expansion shown in FIG. 7 has the advantage of dynamic expansion and shrinking as customers' needs change. VDC shrinking can be performed by releasing the unneeded VMs and bandwidths and is not shown in FIG. 7, since it is a relatively simple operation. For VDC expansion, there are two typical expansion cases. In the first case, bandwidth reservations may be increased for existing VM-pairs. In the second case, new VMs are added. A straightforward solution is to first release the old VDC and then allocate a new one according to the expanded request. But this solution requires a migration of all the existing VMs from the old host servers to the new ones, hence increasing both service interruption time and network overhead.

The VDC allocation may need adjustment when various failures occur. For link or switch failures, path reallocation may be performed for all affected VDCs. When servers fail, all their hosted VMs become unavailable and new VMs may be allocated to replace the affected ones.

Incremental expansion and failures may be addressed with the same algorithm, which is based on VDCAlloc described above. The goal is to minimize reallocations of existing VMs. Moreover, existing routing paths may be reused whenever possible. When bandwidth reservation of a VM-pair is increased, the bandwidth reservation may first be tried along its existing path. When the existing path cannot meet the requirement (due to link or switch failure, or due to insufficient bandwidth along that path), a new path for that VM-pair may be allocated. When path reallocation is not possible, VM migration becomes inevitable. An existing VM needs migration if the ingress or egress residual bandwidth of its host server cannot meet the expanded requirement.

In this case, a to-be-allocated VM set may be maintained which includes the newly added VMs and the VMs that need reallocation. An attempt to allocate VMs within the same cluster of the existing VMs using the bipartite matching is then attempted. If a matching is found, paths may be allocated. Once a path cannot be allocated between an existing VM and a to-be-allocated VM, that existing VM is added into the to-be-allocated VM set and the process is repeated. If a matching cannot be found, VDC expansion or reallocation within this cluster is not possible. A larger cluster is chosen which contains this existing cluster and the process is repeated.

Defragmentation is another advantage to the VDC allocation architecture. An advantage of server virtualization is that VMs can be migrated from one server to another. VM migration can be used for not only server upgrade and maintenance, but also for better network utilization. An example may be used to illustrate this concept. Suppose a small number of VMs of $VDC_0$ are mapped to servers in a cluster $C_0$ and most of the other VMs are mapped to a cluster $C_1$. When VMs of some other VDCs in $C_1$ are released, it is possible to migrate VMs of $VDC_0$ in $C_0$ to $C_1$. The migration not only increases the residual capacity of the physical infrastructure (due to the fact that the inter $C_0$-$C_1$ bandwidth of $VDC_0$ is released), but also improves the performance of $VDC_0$ by reducing the path lengths among its VMs.

Based on the above observation, a VDC defragmentation algorithm may be used. When a VDC is released from a cluster, a check is made to determine if VMs of some VDCs may be migrated to this cluster. To accelerate VDC selection, VMs scattered in different clusters as defragmentation candidates may be marked. A defragmentation is typically carried out when the following two conditions are met: 1) the bandwidth reservation of the reallocated VDCs can still be met and 2) the total residual bandwidth of the physical infrastructure is increased.

VDC defragmentation is a background process and may be performed when the activity of the to-be-migrated VM is low to minimize the interruption of the running services.

The functions and processes described herein are represented by a sequence of operations that can be implemented by or in hardware, software, or a combination thereof. In the context of software, the blocks represent computer executable instructions that are stored on computer readable media and that when executed by one or more processors perform the recited operations and functions. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process.

For instance, the components can include, but are not limited to, one or more processors (e.g., any of microprocessors, controllers, and the like), a system memory, and a system bus that couples the various system components. The one or more processors process various computer executable instructions to control the operation of the computing device and to communicate with other electronic and computing devices. The system bus represents any number of several types of bus structures, including a memory bus or memory controller, a peripheral bus, an accelerated graphics port, and a processor or local bus using any of a variety of bus architectures.

The system may include a variety of computer readable storage media which can be any media that is accessible by a computing device and includes both volatile and non-volatile media, removable and non-removable media. The system memory includes computer-readable storage media in the form of volatile memory, such as random access memory (RAM), and/or non-volatile memory, such as read only memory (ROM).

The computing device may include other removable/non-removable, volatile/non-volatile computer storage media. By way of example, a hard disk drive may read from and write to a non-removable, non-volatile magnetic media, a magnetic disk drive may read from and write to a removable, non-volatile magnetic disk (e.g., a "floppy disk"), and an optical disk drive may read from and/or write to a removable, non-volatile optical disk such as a CD-ROM, digital versatile disk (DVD), or any other type of optical media.

Any number of program modules may be stored on the hard disk, magnetic disk, optical disk, ROM, and/or RAM, including by way of example, an operating system, one or more application programs, other program modules, and program data. Each of such operating system, application programs, other program modules, and program data (or some combination thereof) may include an embodiment of the systems and methods described herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A system comprising:
    a virtual data center manager in a physical data center for allocating bandwidth and allocating a plurality of routing paths for a plurality of virtual data centers, the physical data center comprising a plurality of servers and a plurality of switches;
    the plurality of servers configured to perform packet classification and to define a particular path of the plurality of routing paths with source routing; and
    the plurality of servers and the plurality of switches configured to implement priority queuing for the plurality of routing paths.

2. The system of claim 1, wherein the plurality of routing paths is based on port switching configured to carry a sequence of next-hop output port numbers.

3. The system of claim 2, wherein the port switching is topology and addressing agnostic.

4. The system of claim 1, further comprising hypervisors located in the plurality of servers configured to store a plurality of virtual-to-physical mappings, the plurality of routing paths and an associated bandwidth reservation state.

5. The system of claim 1, wherein the plurality of routing paths is implemented in an operating system as a kernel driver on each of the plurality of servers.

6. The system of claim 1, wherein the plurality of switches is stateless to enable state maintenance scalability.

7. The system of claim 1, wherein the virtual data center manager is configured to incrementally expand a particular virtual data center as bandwidth guarantees change and/or additional virtual machines are added to the particular virtual data center.

8. The system of claim 1, wherein the defining of the particular path includes shaping the particular path using the source routing.

9. The system of claim 1, wherein the defining of the particular path further includes pinning the particular path using the source routing.

10. One or more computer storage devices maintaining computer executable instructions that when executed by one or more processors perform acts comprising:
    allocating, by a virtual data center manager in a physical data center, bandwidth and a plurality of routing paths for a plurality of virtual data centers, the physical data center comprising a plurality of servers and a plurality of switches;
    performing, by the plurality of servers, packet classification;
    defining, by the plurality of servers, a particular path with source routing; and
    implementing, by the plurality of switches and the plurality of servers, priority queuing for the plurality of routing paths.

11. The one or more computer storage devices of claim 10, wherein the plurality of routing paths is based on port switching configured to carry a sequence of next-hop output port numbers.

12. The one or more computer storage devices of claim 11, wherein the port switching is topology and addressing agnostic.

13. The one or more computer storage devices of claim 10, the acts further comprising storing, by hypervisors located in the plurality of servers, a plurality of virtual-to-physical mappings, the plurality of routing paths and an associated bandwidth reservation state.

14. The one or more computer storage devices of claim 10, wherein the plurality of routing paths is implemented in an operating system as a kernel driver on each of the plurality of servers.

15. The one or more computer storage devices of claim 10, wherein the plurality of switches are stateless to enable state maintenance scalability.

16. The one or more computer storage devices of claim 10, wherein the virtual data center manager is configured to incrementally expand a particular virtual data center as bandwidth guarantees change and/or additional virtual machines are added to the particular virtual data center.

17. The one or more computer storage devices of claim 10, wherein the defining of the particular path includes shaping and pinning the particular path using the source routing.

18. A method comprising:
  allocating, by a virtual data center manager in a physical data center, bandwidth and a plurality of routing paths for a plurality of virtual data centers, the physical data center comprising a plurality of servers and a plurality of switches;
  performing, by the plurality of servers, packet classification;
  defining a particular path with source routing; and
  implementing, by the plurality of switches and the plurality of servers, priority queuing for the plurality of routing paths.

19. The method as recited in claim 18, further comprising locating hypervisors in the plurality of servers configured to store a plurality of virtual-to-physical mappings, the plurality of routing paths and an associated bandwidth reservation state.

20. The method as recited in claim 18, further comprising incrementally expanding a particular virtual data center as bandwidth guarantees change and/or additional virtual machines are added to the particular virtual data center.

* * * * *